United States Patent
Johnson

(10) Patent No.: US 8,862,094 B2
(45) Date of Patent: Oct. 14, 2014

(54) SYSTEM AND METHOD FOR MODIFYING CALLING BEHAVIOR

(71) Applicant: Starscriber Corporation, Scottsdale, AZ (US)

(72) Inventor: Roderick Michael Johnson, Scottsdale, AZ (US)

(73) Assignee: Starscriber Corporation, Scottsdale, AZ (US)

( * ) Notice: Subject to any disclaimer, the term of this patent is extended or adjusted under 35 U.S.C. 154(b) by 0 days.

(21) Appl. No.: 14/057,491

(22) Filed: Oct. 18, 2013

(65) Prior Publication Data

US 2014/0045453 A1    Feb. 13, 2014

Related U.S. Application Data

(63) Continuation of application No. 12/431,572, filed on Apr. 28, 2009, now Pat. No. 8,594,637.

(60) Provisional application No. 61/125,610, filed on Apr. 28, 2008.

(51) Int. Cl.

| | |
|---|---|
| H04W 72/00 | (2009.01) |
| H04M 3/42 | (2006.01) |
| H04M 1/2745 | (2006.01) |
| H04M 15/00 | (2006.01) |
| H04W 4/24 | (2009.01) |

(52) U.S. Cl.
CPC .......... *H04M 15/58* (2013.01); *H04M 2250/60* (2013.01); *H04M 1/274566* (2013.01); *H04M 3/42382* (2013.01); *H04W 4/24* (2013.01); *H04M 2203/652* (2013.01); *H04M 2203/1008* (2013.01)

USPC .... 455/406; 455/564; 455/414.1; 379/201.01

(58) Field of Classification Search
CPC .................. H04M 1/274566; H04M 3/42382; H04M 2203/1008; H04M 2203/652; H04M 2250/60
USPC .......... 455/414.1, 564, 565, 405; 379/202.01, 379/210.02

See application file for complete search history.

(56) References Cited

U.S. PATENT DOCUMENTS

| | | | |
|---|---|---|---|
| 6,023,617 A | | 2/2000 | Cooper et al. |
| 6,285,753 B1 * | | 9/2001 | Slusher .................... 379/355.06 |
| 6,360,108 B1 * | | 3/2002 | Rogers ......................... 455/564 |

(Continued)

FOREIGN PATENT DOCUMENTS

| | | |
|---|---|---|
| JP | 2006/074304 | 3/2006 |
| WO | WO 99/46911 | 9/1999 |

(Continued)

OTHER PUBLICATIONS

Pakistan Patent Application No. 669/2007: Application dated Jun. 9, 2007, 41 pages.

*Primary Examiner* — Nizar Sivji
(74) *Attorney, Agent, or Firm* — Baker & Hostetler LLP

(57) ABSTRACT

A method for modified dialing behavior includes capturing a dialing stream in a virtual input buffer, comparing the dialing stream of the calling party to a history of dialing streams stored in a database, analyzing the history of dialing streams to determine a desired dialing behavior of the calling party, and passing a modified dialing stream to a mobile operating system based on the determined desired dialing behavior of a calling party.

20 Claims, 9 Drawing Sheets

(56) References Cited

U.S. PATENT DOCUMENTS

| | | |
|---|---|---|
| 6,449,497 B1 * | 9/2002 | Kirbas et al. ............. 455/564 |
| 7,298,831 B1 | 11/2007 | Keohane et al. |
| 7,764,955 B1 | 7/2010 | Mangal et al. |
| 8,090,401 B2 | 1/2012 | Soto |
| 2003/0036394 A1 | 2/2003 | Henry-Labordere |
| 2003/0084106 A1 | 5/2003 | Erev et al. |
| 2003/0142652 A1 | 7/2003 | Ting et al. |
| 2003/0199274 A1 | 10/2003 | Lim |
| 2004/0018857 A1 | 1/2004 | Asokan et al. |
| 2004/0019539 A1 | 1/2004 | Raman et al. |
| 2004/0077349 A1 | 4/2004 | Barak et al. |
| 2004/0120494 A1 | 6/2004 | Jiang et al. |
| 2004/0218609 A1 | 11/2004 | Foster et al. |
| 2004/0224710 A1 | 11/2004 | Koskelainen et al. |
| 2005/0094796 A1 | 5/2005 | Beauford |
| 2005/0105706 A1 | 5/2005 | Kokkinen |
| 2005/0117726 A1 | 6/2005 | DeMent et al. |
| 2006/0025141 A1 | 2/2006 | Marsh et al. |
| 2006/0165050 A1 | 7/2006 | Erhart et al. |
| 2007/0197260 A1 | 8/2007 | Randall et al. |
| 2007/0211872 A1 | 9/2007 | Cai et al. |
| 2007/0218877 A1 | 9/2007 | Mills |
| 2008/0242343 A1 | 10/2008 | Koh et al. |
| 2009/0225972 A1 | 9/2009 | Kahn |

FOREIGN PATENT DOCUMENTS

| | | |
|---|---|---|
| WO | WO 99/48266 | 9/1999 |
| WO | WO 99/51008 | 10/1999 |
| WO | WO 2004/100521 | 11/2004 |
| WO | WO 2007/141762 | 12/2007 |

* cited by examiner

SYSTEM AND METHOD FOR MODIFYING CALLING BEHAVIOR

CROSS REFERENCE TO RELATED APPLICATIONS

This application is a continuation of, and claims priority to, U.S. patent application Ser. No. 12/431,572, filed Apr. 28, 2009, which claims priority to U.S. Provisional Patent Application No. 61/125,610 filed Apr. 28, 2008, the entire contents of which are hereby incorporated herein by reference.

TECHNICAL FIELD

This invention relates generally to the field of mobile telephony involving the monitoring and modifying of calling behavior, and more particularly to a system and method of modifying calling party behavior to affect more efficient use of mobile network resources.

BACKGROUND

In many mobile markets, large constituencies of mobile subscribers have insufficient economic capacity to operate a mobile phone on a credit account, commonly called a post-paid mobile account. Such users are referred to herein as post-paid subscribers. In such markets, the largest constituencies of users are pre-paid subscribers. Pre-paid subscribers, either periodically or randomly, purchase set amounts of network credits which are then used to make voice calls or send text messages. Once those credits are consumed, the pre-paid subscribers are unable to make voice calls or send text messages until such time as they purchase and pre-pay for further credits.

In most of these same markets, mobile services such as voice and text messaging are provided using a method called Calling Party Pays (CPP). This is contrary to the typical North American model where each party pays for a call or text message, regardless of whether it is initiating or receiving such calls or messages. The CPP method is the most prevalent method in use in mobile markets. In theory, every subscriber will pay for calls or messages they initiate, and the recipient party pays nothing. In practice, those with the greatest economic capacity freely make calls and send messages whenever they want, while the least economically capable portion of the constituency must carefully use and conserve their credits preserve their credits. Therefore the natural tendency of less economically capable subscribers in CPP markets, when faced with the dilemma of wanting or needing to communicate, has been to find ways to effect such communication in the most efficient manner possible, where the best possible efficiency is to be the recipient of such communication.

The most prevalent method used to become the recipient is what is commonly referred to as "beeping" or "slamming", where one subscriber will call another, let the line ring two or more times, and then hang up before calling charges apply. In some cases, this is done to affect a return call, wherein the calling party would then become the call recipient. In many cases however, where both parties are familiar, these intentionally dropped calls (IDC) have evolved into a primitive, but socially acceptable and cost effective methods for them to enjoy economically sustainable communication between such familiar parties or what could also be described as a form of "signaling". This ability to signal can represent a significant portion of the value such subscribers' feel they should get from a mobile network subscription. These signaling methods consume considerable network resources and some percentage of available frequency spectrums deployed to deliver mobile services, such as control and voice channels allocated during such attempts, as well as utilizing capacity on other network infrastructure elements. In densely populated urban and suburban environments, this can lead to increased network congestion, lower quality of service and dropped calls and a myriad of other problems.

However, as mobile penetration rates grow, the average capacity of new subscribers to pay decreases, inexorably increasing the percentage of mobile network capacity consumed by subscribers communicating in such a manner.

Callers with limited financial capacity, that run out of credit, are termed Zero Credit callers, and as such any efforts they make to communicate or attempt to signal would be uneconomic, consuming resources with no revenue for the network. As long as a Zero Credit mobile device is registered however that device can continue to receive calls. As such, there are networks that use network based services strategies to provide some ability for such Zero Credit customers to indicate their desire to communicate with parties that are willing to place a return call. These methods typically require a Zero Credit caller to use inconvenient methods such as USSD based services which require a subscriber to input a series of characters beyond those numbers required to place the call. Other services look at network server based methods that flag call requests that are rejected by a prepaid service or other network services that reject call requests for a lack of credit or funds.

SUMMARY

The invention described uses client based methods to modify typical subscriber behavior in a manner that recognizes and reinforces economically challenged subscribers' ability to communicate and be the recipient of communications that also minimizes the associated uneconomic usage of mobile network resources for both IDC and Zero Credit subscribers.

As such, a method for modified dialing behavior is provided which includes capturing a dialing stream in a virtual input buffer, comparing the dialing stream of the calling party to a history of dialing streams stored in a database, analyzing the history of dialing streams to determine a desired dialing behavior of the calling party, and passing a modified dialing stream to a mobile operating system based on the determined desired dialing behavior of a calling party.

The method further includes notifying the calling party that the modified dialing stream has been sent to the mobile operating system, recording the dialing stream of the calling party in a database, and continually revising the dialing behavior based on the additional dialing stream. The database is located on one of a subscriber interface module, a memory stick, or a handset. The method includes the dialing stream of the calling party being a dialing pattern that is a sequence of characters, numbers, or both which would not be recognized as a valid entry by a telephony network. The method includes modifying the dialing stream to result in an intentionally dropped call or an insufficient credit call. Statistically significant historical dialing behaviors and dialing patterns are used to improve the performance of the method. Business rules validate dialing behavior and dialing patterns prior to passing user input held in the virtual input buffer to a mobile operating system for further call processing.

The method of the present invention also includes sending a message to the dialed party, wherein the message sent is in the form of machine readable code in a network protocol that can be interpreted by one or more network elements and may be a USSB service and include location information. The message may be capable of being interpreted by client software resident on the dialed party's mobile as the discovery of similar client software and receiving a message in the form of machine readable code in a network protocol from the dialed party's mobile client software that acknowledges discovery of the dialing party's mobile handset. A method for communicating with a calling party also includes receiving a message from a calling party, interpreting the message as a discovery of similar client software operating on the calling party's handset, and sending a discovery message to the calling party to facilitate further communications, wherein the received message is interpreted by a dialed party's mobile as a command to automatically initiate a call back to the calling party. The message sent may be in the form of machine readable code in a network protocol that can be interpreted by one or more network elements, wherein the machine readable code inside the network protocol is constructed for delivery to a network element which is a USSD service.

Yet another method of communication between a calling party and a called party includes determining a dialing behavior of a calling party, analyzing a dialing stream of the calling party with reference to the dialing behavior of the calling party, suggesting modified dialing behavior of the called party, and controlling a modified dialing stream sent to a mobile operator system based on the suggesting step which mimics the determined calling behavior of the calling party, wherein the analyzing step indicates that the dialing behavior is indicative of an intentionally dropped call or an insufficient credit call. The method may include receipt of a comfort message indicating that a missed call message has been sent to the called party, or a discovery message from the receiving party indicating that the receiving party also uses a similar client.

Also provided is a handset including a keypad configured for receiving keystrokes from a calling party, a virtual keystroke buffer, a memory for recording keystrokes; and a processor configured for preprocessing the dialing stream, passing a preprocessed dialing stream to a mobile operating system, recording the dialing pattern of the dialing party to a statistical database, analyzing the virtual keystroke buffer with reference to the database to determine the dialing behavior of the dialing party; and suggesting modified dialing behavior to the calling party. The processor is further configured to send modified dialing streams to the network as a result of the suggesting step, to receive modified dialing streams from the calling party as a result of the suggesting step, to send a comfort message to the calling party, to send a message to a called party requesting a return call, to receive a discovery message from the called party, and to send a message indicative of a USSB service based.

Further, there is a method for modified dialing behavior including capturing a dialing stream input sequence which includes a send command and a "#" or "*" character and in a virtual input buffer, comparing the dialing stream of the calling party to a history of dialing streams stored in a database, analyzing the history of dialing streams to determine a desired dialing behavior of the calling party, passing a modified dialing stream to a mobile operating system based on the determined desired dialing behavior of a calling party, and wherein based on the modified dialing stream, services are initiated via machine readable code inside a protocol that is constructed for delivery to a network element which is a USSD service element.

The machine readable code inside a protocol that is constructed for delivery to a network element may be subsequently routed to be processed by a service external to and separate from the network. The machine readable code includes location information available locally at the mobile device or the location information is supplied by a network element. The service initiated may be to locate the mobile device initiating the service wherein the location information is used to select a location based mobile ad for delivery to mobile user initiating the service. The service initiated may be to request the location of another mobile device or to request navigation directions from the location of the initiating party to the location of another mobile party whose number was dialed, or to request navigation to a fixed address. Finally, the service to be initiated may be initiating a more economical long distance service voice call, initiating a voice call over a network connection other than the mobile network connection, such as a VoIP call or a call over a user preferred network. The invention also includes computer-readable storage medium having instructions stored thereon which, when loaded onto a computer, cause the computer to perform the methods described above

BRIEF DESCRIPTION OF THE DRAWINGS

The foregoing and other aspects of the present invention will be better understood from the following detailed description with reference to the drawings, wherein.

DETAILED DESCRIPTION OF ILLUSTRATIVE EMBODIMENTS

Mobile devices have been designed to respond to user input in definitive ways, and in the case of making a mobile voice call, the most definitive and pervasive input being a "Send" input or any such input which causes a voice call or other network service to immediately be initiated by a Mobile Operating System (MOS) and the "End" input which causes the MOS to terminate a voice call. "Send" could refer to any method which could be used to allow a user to initiate a voice call or other such service, and "End" could be used to refer to any method which could be used to terminate a voice call or other such service.

Figure 1:
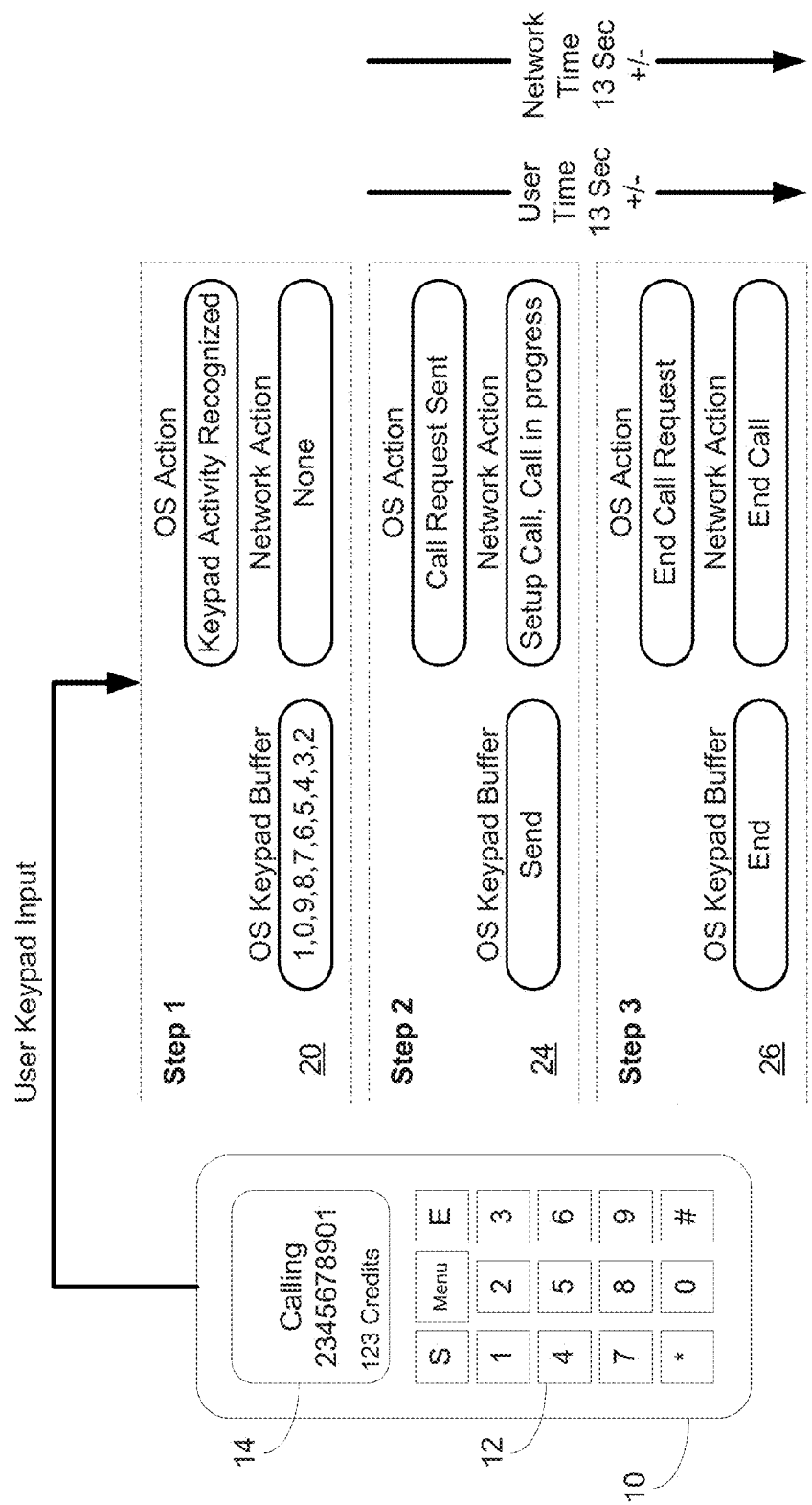
FIG. 1 illustrates an example of the dialing stream of an intentionally dropped call.

FIG. 1 describes the typical user input, user time and approximate network resource utilization time involved during the normal sequence of an IDC. The user inputs the dialing stream 2345678901 (shown on screen 14) into the keypad 12 on mobile telephone 10. Step 1 at block 20 shows the operating system ("OS") keypad buffer and the OS action and network action, the latter being none. Step 2 at block 24 shows the OS keypad buffer with the send key, and the subsequent OS action and network action, the latter showing the call being set up. Finally, step 3 at block 26 shows the OS keypad buffer with the end key, and the related OS action and network action, the latter being "end call". IDC's typically take twelve (12) or more seconds to complete, as the calling party's goal is to stay on the line just long enough to ensure that their Caller ID information has been captured so that the dialed party knows who the IDC is from, without which the IDC may not affect the communication desired.

In the case where a subscriber places an IDC such as described in FIG. 1 above, as opposed to the MOS being allowed to respond immediately to the "Send" and or "End" user input, one method of the invention introduces a time delay between the time when dialed information, such as "Send" or "End" is input by the user through the act of dialing, and the time when a MOS would be allowed to interpret such resulting dialed information. During this time delay, alternative dialing information could be introduced by the user, which signals their desire to use one or more of the preferred dialing and or signaling methods of the invention. At a primary level the invention incorporates a method to capture user input (the act of dialing) before such input is passed through to an MOS. One exemplary but non-limiting method, is to cause the information generated by a user dialing normally to be intercepted and stored in the invention's local "virtual" keystroke buffer (VKB) as opposed to the normal Mobile Operating system Keystroke Buffer (MOSKB). The act of dialing could include normal keypad entry where a user presses numbered keys on the handset in the order of the number being dialed and or via a menu that provides access to numbers stored in memory, or as a "speed dial key", which when pressed dials the number string for the user, or other such methods which might produce the number string typically used to place a voice call. As part of the act of dialing, the user presses a key to initiate the voice call, which could be the "Send" key, or possibly a voice recognition system which performs all related dialing functions, hereinafter referred to as the dialed information. The dialed information captured in the VKB is then recorded to a local statistics database and then interpreted by one or more smart algorithms which uses these captured statistics to "learn" the dialing behavior and network usage habits of the user. The invention then compares this dialing behavior and associated network usage habits to a local Subscriber Behavior Database (SBD), which contains known examples of one or more specific dialing patterns and or behaviors and network usage patterns. The VKB information could also be compared to a local Business Rules Database (BRD), which may include, but is not limited to, reserved or approved number ranges, specific credit or economic requirements, home network information, roaming privileges of the subscriber, and other such business rules as may be considered to determine the validity of the dialed information resident in the VKB before releasing all or a portion of the dialed information in the VKB to the MOSKB for subsequent interpretation and processing by the MOS. At a secondary level, those dialing behaviors, dialing patterns and network usage which are known to result in the inappropriate usage of a mobile network's resources, as evidenced by comparison to the SBD and or BRD, or other such information which could be used for such analysis are flagged by the invention, which then engages one or more methods which cause the subscriber to modify their dialing and network usage habits to preferred methods.

Some dialing behavior, such as an IDC, may not necessarily be apparent until after the fact, or possibly be difficult to be certain of until cumulative dialing behavior statistics can prove that such behavior is intentional, after which such behavior would be flagged. Such flags could then trigger one or more behavior modification methods of the invention.

As opposed to the old behavior which inefficiently consumed network resources, such as described in FIG. 1 above, the preferred behavior desired could be to cause the user to dial the number, press "Send" and then immediately press "End" as opposed to an IDC where an "End" is typically delayed by many seconds. This dialed number, "Send" and "End" sequence results in an altered user input and decreased calling party time and reduced network resource utilization time as compared to the normal sequence of an IDC.

Figure 2:
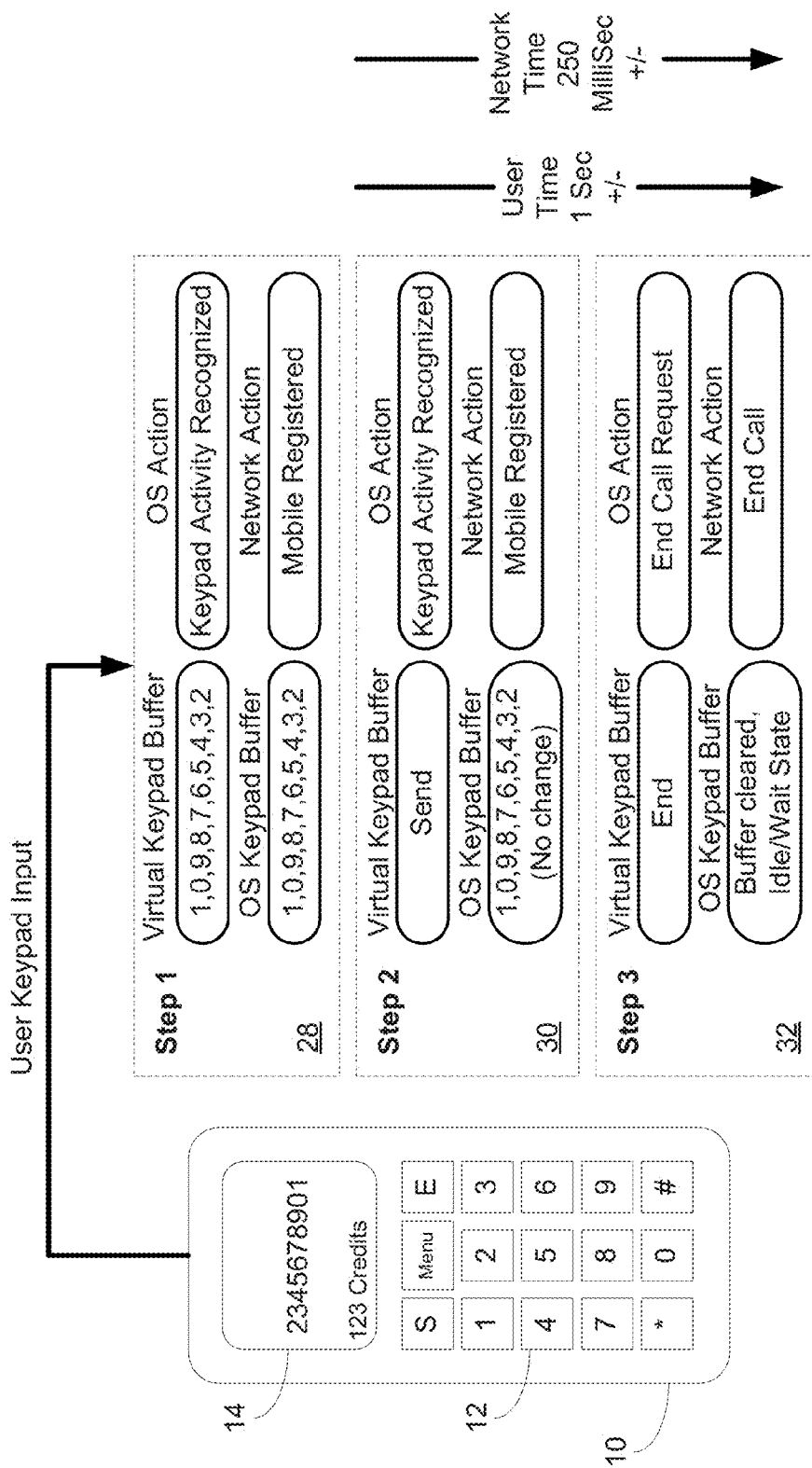
FIG. 2 illustrates the example of an intentionally dropped call with modified dialing behavior.

As shown by the non-limiting example in FIG. 2, this modified calling party behavior still utilizes essentially the same three step process from the calling party's perspective as outlined with respect to FIG. 1, however, by utilizing the VKB, the call set-up process is never engaged by the network. Rather, the VKB buffer sequence is interpreted in the handset client as a request to send a message via a bearer service that may be interpreted by a receiving party as, for example, a request for call-back.

In the example of FIG. 2, this process may talk as little as one (1) second of user time and 250 ms of network time. The user inputs the dialing stream 2345678901 (shown on screen 14) into the keypad 12 on mobile telephone 10. Step 1 at block 28 shows the Virtual Keypad Buffer ("VKB"), OS keypad buffer and the OS action and network action, the latter being "Mobile registered". Step 2 at block 30 shows the VKB with send key, the OS keypad buffer unchanged, and the subsequent OS action and network action, the latter still showing "Mobile Registered". Finally, step 3 at block 32 shows the VKB with the End key, the OS keypad buffer cleared, and the related OS action and network action, the latter being "Send Message via Bearer Service".

A user that has modified their calling/dialing behavior for circumstances where their intention is not to call, but rather to communicate and or signal for free through the use of the Modified Intentionally Dropped Call (MIDC) scenario described above receives an immediate benefit in the form of much improved convenience. One additional benefit may be realized in which charges are avoided which would otherwise be incurred if a user dials another party, and before they can "End" the call, the dialed party answers, generating a call charge. For those economically challenged subscribers that want or need to preserve their network time credits for their most important or urgent communications, this provides additional motivation to use the alternative signaling method, beyond the time convenience. It can be further concluded by comparing the amount of network resource utilization between FIGS. 1 and 2, that sending a message to the dialed party that produces the same net benefit for the user as an IDC, results in substantially more efficient use of network resources, therefore being advantageous for the network operators as well. It should be noted that since the invention makes the decision on what specific dialed input will trigger what particular event, many alternative dialing patterns could be introduced, any one of which could identify the intent of the dialer uniquely and therefore logically trigger the unique service being desired by the user.

Behavior Pattern Guidelines for Managing IDC

IDC behavior guidelines may be as simple as flagging any behavior as described in FIG. 1 above, or setting a limit on the number of times of such behavior and/or the frequency of such behavior. However, there may be some benefit to logging all dialing behavior, and then using these longer term statistics to make more informed decisions as to when and how to best invoke subscriber behavior modification. Such an example may be where historical subscriber data indicated little or no prior IDC activity, and as such a single incident where someone dials a number, presses "Send", and then must "End" the call before the call is connected for some reason, other than an intended IDC, might not be flagged for behavior modification by the invention. Business rules might also preclude flagging, such as a category of commercial customer or other such statistical subscriber grouping.

Another consideration may be that dialing behavior and or dialing patterns, such as how fast a number is dialed, or how soon after the completed number dialing sequence has been completed that a "Send" is input, could provide valuable information as to how long to set the VKB delay, to improve the certainty of the intentions of the subscriber. Alternatively, once a Subscriber who has modified their behavior in a known way, such as dialing a number and a "Send" input, and then immediately pressing "End" within a narrow range of time immediately afterwards, may cause one or more methods of the invention to modify the guidelines and or adjust the pattern used for comparison to be more consistent to this known behavioral pattern and therefore improve the responsiveness of the invention from the user's perspective.

Once the handset client has determined through dialing pattern and or dialing behavior or some pattern of behavior, such as one or more IDC events, one or more methods of the invention may present a suggested dialing behavior to use as an alternative. Mobile Devices offer a number of user interface options through which to communicate suggested preferred dialing behavior. Some combination of visual cues and/or textual cues and or audible/cues or otherwise some combination of cues to the mobile subscriber to alert and capture their attention may be used so that the preferred suggested behavior presentation will be viewed and understood by the user.

Figure 3:
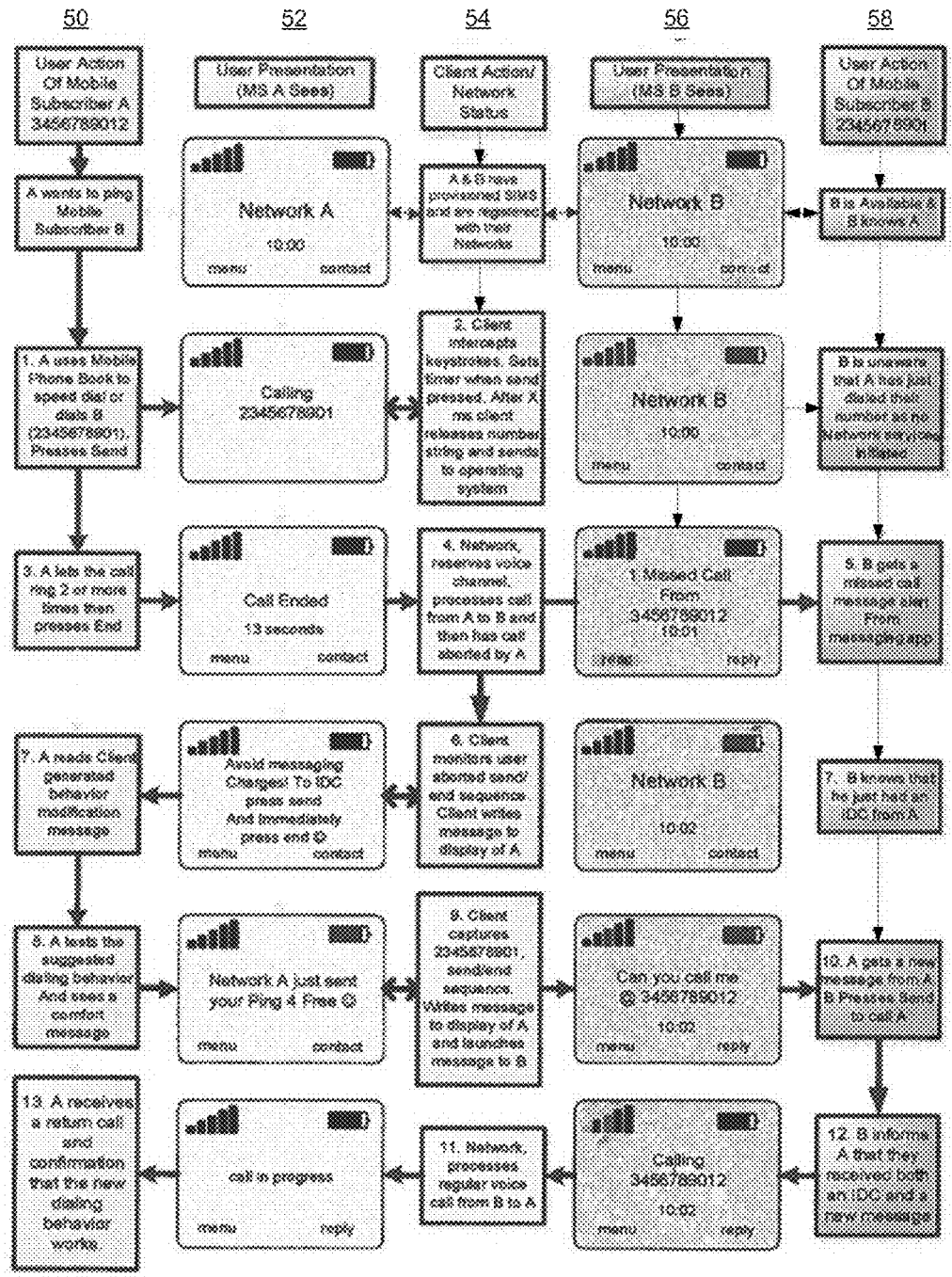
FIG. 3 illustrates the call flow of an intentionally dropped call from A to B and the subsequent returned call from B to A.

One non-limiting example is described in FIG. 3 which shows a call flow represented by five columns. The first column 50 illustrates the desired action of calling party A. The second column 52 represents the screen display of calling party A. The third column 54 illustrates the handset client action and the network status. The fourth column 56 shows the screen display of the handset of recipient party B, while the fifth column 58 illustrates the activity of the recipient party B. In this example, A wants to notify B to place a return call. At sub-block 1 of column 50, A dials the number for B. At sub-block 2 of column 54, the client intercepts the dialing stream and sets a delay timer. At sub-block 3 of column 50, A lets the phone ring twice, then intentionally drops the call by hitting End. At sub-block 4 in column 54, the network reserves voice channel and processes the call, and then determines the call has been aborted by A. At sub-block 5 of column 58, B receives a missed call notification. At sub-block 6 in column 54, the client monitors the dialing behavior of A and sends a message to A as shown in column 52, suggesting that A press "Send" and immediately press "End" thereafter. At sub-block 7 of column 50, the client reads the suggested dialing behavior modification message. At sub-block 8 of column 50, A tests the suggested dialing behavior modification. At sub-block 9 in column 54, the client captures the modified dialing sequence and writes a message (shown in column 56) to B. At sub-block 10, B reads the message and presses send to call A. At sub-block 11 in column 54, the network processes a voice call from B to A. At sub-block 12 in column 58, B informs A of the receipt of the IDC and the new message. Finally, at sub-block 13 in column 50, A receives the return call and confirmation that the dialing behavior modification was successful.

At a fundamental level, a Zero Credit call attempt and an IDC exhibit a similar dialing pattern and dialing behavior. The main differences are that a Zero Credit call is terminated by the network for a lack of credit, and an IDC call is terminated by the user.

Figure 4:
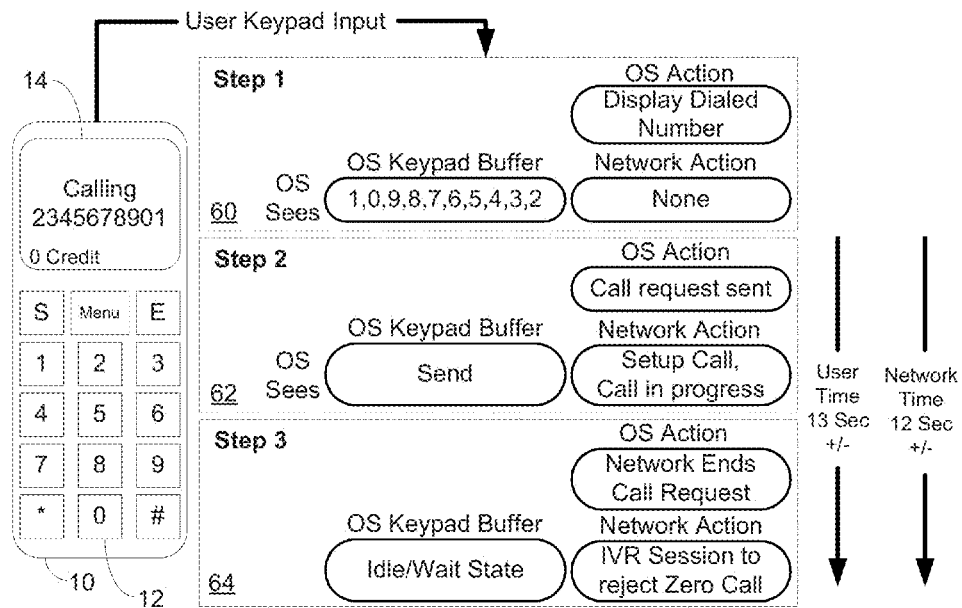
FIG. 4 illustrates an example of a dialing stream of a zero credit call attempt.

FIG. 4 describes the typical user dialing pattern, user time and approximate network resource utilization time involved during the normal sequence of a Zero Credit call attempt. The user inputs the dialing stream 2345678901 (shown on screen 14) into the keypad 12 on mobile telephone 10. Step 1 at block 60 shows the operating system ("OS") keypad buffer and the OS action and network action, the latter being none. Step 2 at block 62 shows the OS keypad buffer with the send key entered, and the subsequent OS action and network action, the latter showing the call being set up. Finally, step 3 at block 64 shows the OS keypad buffer with the idle state, and the related OS action ending the call request and network action, the latter being "IVR session to end the call". It is estimated that that sequence may take about 13 seconds of user time and about 12 seconds of network time.

Figure 5:
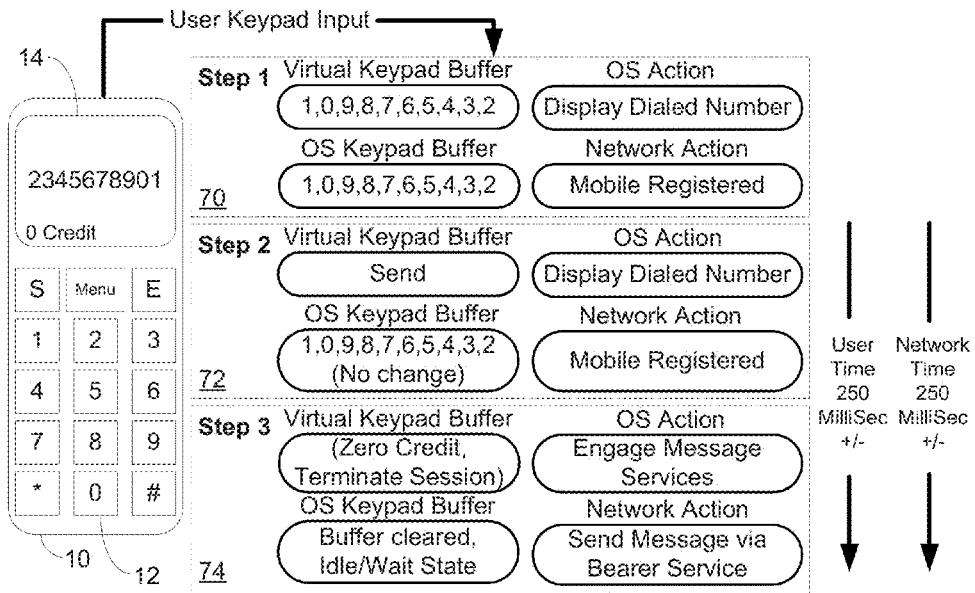
FIG. 5 illustrates the example of the zero credit call attempt with modified dialing behavior.

FIG. 5 provides an example of a modified dialing pattern in the Zero Credit example which can dramatically improve the convenience to a user while minimizing network resource usage. The user inputs the dialing stream 2345678901 (shown on screen 14) into the keypad 12 on mobile telephone 10. Step 1 at block 70 shows the Virtual Keypad Buffer ("VKB"), OS keypad buffer and the OS action and network action, the latter being "Mobile registered". Step 2 at block 72 shows the VKB with send key, the OS keypad buffer unchanged, and the subsequent OS action and network action, the latter still showing "Mobile Registered". Finally, step 3 at block 74 shows the VKB with the "zero credit, terminate session" status, the OS keypad buffer cleared, and the related OS action to engage message services and network action, the latter being "Send Message via Bearer Service". The estimated time for both the user after hitting send and the network is on the order of 250 ms.

It can be seen by comparison between FIG. 4 and FIG. 5 that Zero Credit call behavior modification, using one or more methods of the present invention to modify the Zero Credit dialing pattern in a manner similar to the example shown, rewards such user behavior modification with extraordinary convenience, while dramatically increasing efficient use of network resources.

Figure 6:
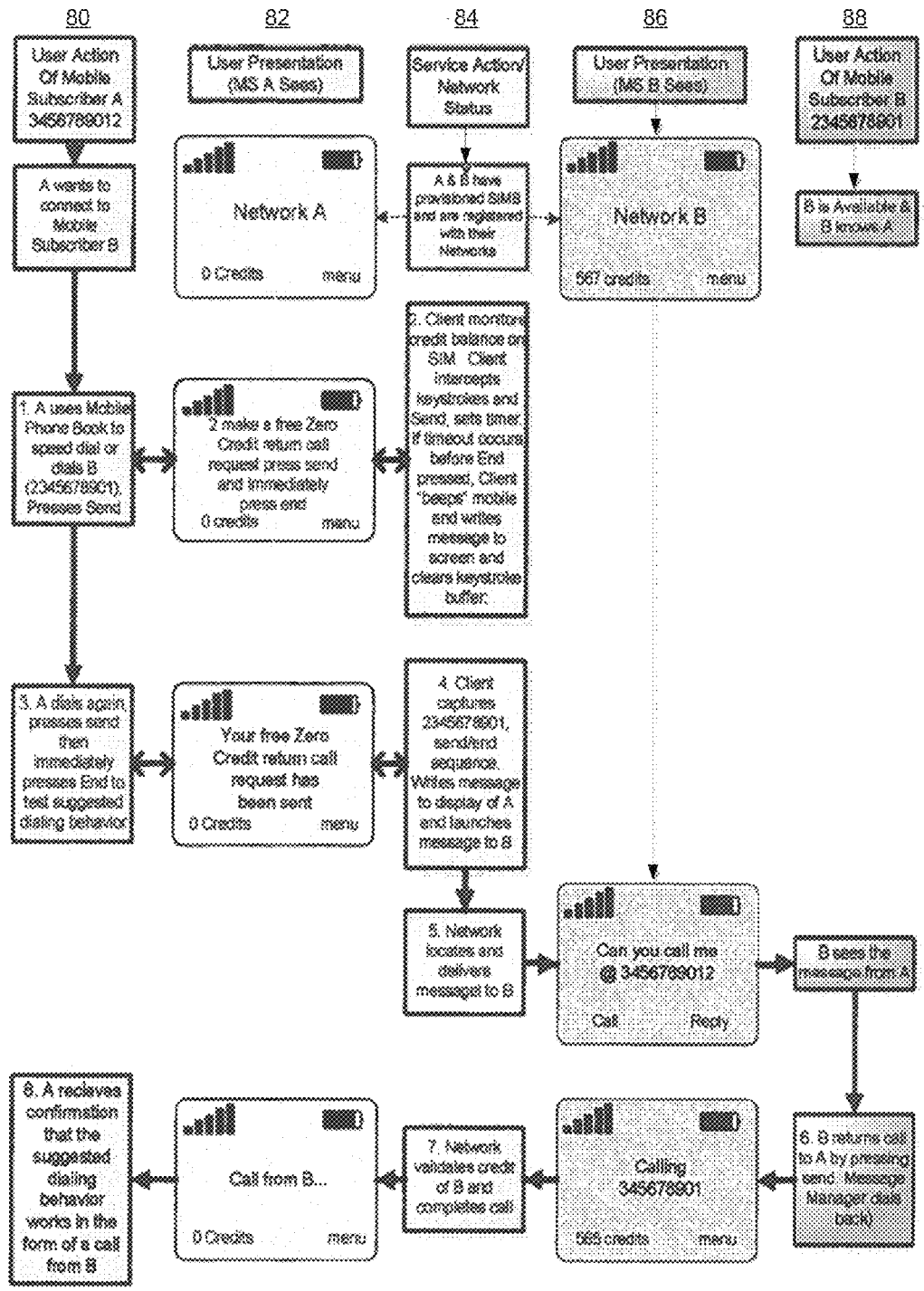
FIG. 6 illustrates the call flow of a zero credit call attempt from A to B and the subsequent returned call from B to A.

One example of such Modified Zero Credit (MZC) Behavior and the modification presentation to the user is shown in FIG. 6. The first column 80 illustrates the desired action of calling party A. The second column 82 represents the screen display of calling party A. The third column 84 illustrates the handset client action and the network status. The fourth column 86 shows the screen display of the handset of recipient party B, while the fifth column 88 illustrates the activity of the recipient party B. In this example, A wants to connect to B but has zero credit. At sub-block 1 of column 80, A dials the number for B. At sub-block 2 of column 84, the client monitors the credit balance, intercepts the dialing stream and sets a delay timer. The client sends a message to the display screen of A in column 82, suggesting dialing behavior modification. At sub-block 3 of column 80, A tests the suggest dialing behavior modification by redialing and immediately pressing the "end" key. At sub-block 4 in column 54, the client captures the dialing sequence and writes an acknowledgement message to A that the request for a return call has been sent and launches a message to B. At sub-block 5 of column 84, the network locates and delivers a message to B. At sub-block 6 in column 88, B returns the call to A by pressing "send". At sub-block 7 of column 84, the network validates the credit of B and completes the call. At sub-block 8 of column 80, A receives the call and confirms that the suggested behavior modification was successful.

Messaging Types and Rules

Alert Messages

One or more methods of the present invention may include formatting messages which have specific uses. One type of message used for the purpose of suggesting behavior modification to change dialing behavior may be called an alert message. These messages alert a subscriber in a friendly fashion during the discovery phase of the modification process. Discovery could be described as when an IDC or Zero Credit dialing attempt have been recognized by the recipient client and an initial attempt is made by the recipient client to alert a calling party to make him aware of the preferred dialing behavior. If a calling party modifies his behavior to the preferred behavior as a result of this initial alert, then the behavior modification may be considered to be successfully concluded. If the initial alert fails to cause behavior modification, it could be that alert messages describing a more urgent requirement to modify behavior, such as a warning of possible financial consequences to IDC attempts or some restriction of subscriber Zero Credit privileges, may be presented as opposed to the initial "friendlier" alert or alerts presented upon the initial recognition of the behavior.

Comfort Messages

One type of message may be described as a comfort message. Comfort messages are created to inform a calling party that their use of the preferred method has achieved the desired results. Comfort messages may be as simple as, "your message to 2345678901 has been sent". Comfort messages may be used by a network operator to reinforce or otherwise improve its relationship with subscribers, with a message such as, "your message to 2345678901 has been sent for free by Network A". Time of day may determine the message content. One example may be a comfort message generated in the morning that said, "Good Morning, Your message to 2345678901 has been sent for free by Network A". One of the clear advantages of a client based strategy as opposed to a network based service is that rich content messages, which might contain a network operator's logo, or animated or active screen images as part of a comfort message may be preloaded in the messaging database of the client, yet these comfort messages never generate network overhead. Delivering rich content messaging from a network based service transported over a network infrastructure for each MIDC or MZC event would add considerably to network overhead. Comfort messages may also be used to advertise and or create brand awareness for other businesses, either as a source of revenue for a network operator, or possibly as a way to have such revenue offset the costs of providing essentially free communication to their subscribers. Business rules may determine some combination of comfort message presentations, such as selecting different brand awareness comfort messages based on contractual parameters or commitments between advertisers and the network. Parameters may include, but are not limited by, the number of times a day each ad is presented, or possibly what time of day an advertisement would be presented or possibly using subscriber behavior as a way to infer which presentation is selected, or possibly the location of the user at the time when such comfort message is presented, or some combination of these types of parameters.

Dialed Party Alert Messages

MZC messages sent to a recipient or dialed party may be different than those sent as a result of an MIDC. Efficient use of network resources may play a key role in determining outgoing message content and payloads. Such messages may also change based on an understanding of a familiar relationship. One or more methods of the client would typically record dialing habits, including the dialed number of the party. For a point of reference, the dialing party is referred to as the A party, and the dialed party is referred to as the B party, hereinafter referred to as A and B, and the relationship between the dialing party and the dialed party as the AB relationship. Some examples of AB relationship information which could be used to determine the type of message sent to B could be how often A dials B, or Zero Credit calls B, or IDCs B, and whether B returns those calls and with what regularity in respect to the regularity of A's attempts.

Messages which get presented to an A party, whether for behavior modification or comfort messages used to reinforce preferred dialing behavior, may require the use of different languages, depending on the market where the client is used. Additionally, there may be local terms for an IDC or a Zero Credit call which a user may be more familiar with, which may be different in different regions or countries. For outgoing messages sent to the B party, the same could be true.

Business and Behavior Rule Settings and Updates

Differing markets may require one or more methods to apply different business rules to Zero Credit and IDC calls, and/or possibly may require other types of dialing patterns to be monitored, flagged and modified. Subscriber behavior such as repeated IDCs to the same party, with no return calls logged may be socially acceptable within some markets, but considered a nuisance in others. Some networks may be so congested that they set a limit on MIDC made per day, yet that same network may choose not to set any daily limit on MZC. In some markets, the reverse may be true.

Some networks may choose to operate a pilot test, with hundreds or thousands of subscribers where no limits are set for MIDC and MZC, to assess subscriber behavior when the methods of the invention are employed within such a subscriber sample group, prior to a broader deployment of the invention. Over the duration of such a pilot, initial subscriber behavior, and longer term subscriber behavior may be quite different, or it may prove to be roughly the same, depending on the market, and possibly the socioeconomic circumstances of the subscriber test group. In many of these cases, changes and or adjustments to Business and Behavior rules and settings may be desired, even if it were simply to gauge subscribers' behavioral response to unlimited MIDC and MZC, versus setting daily limits. During such market testing, it may be useful to adjust behavior modification strategies to gauge subscriber responsiveness to changes in alert messages, comfort messages, or the message an MIDC or MZC sends on behalf of A to B. Theoretically, such testing may then yield analysis that allowed the business rules, behavioral guidelines and messaging rules employed by one or more methods of the invention to be optimized for the unique socioeconomic circumstances of a market, or a network or possibly based on the type and cost of the mobile device the invention operates on, which might only be used by a particular economic class of subscriber.

Client Logic

Figure 7:
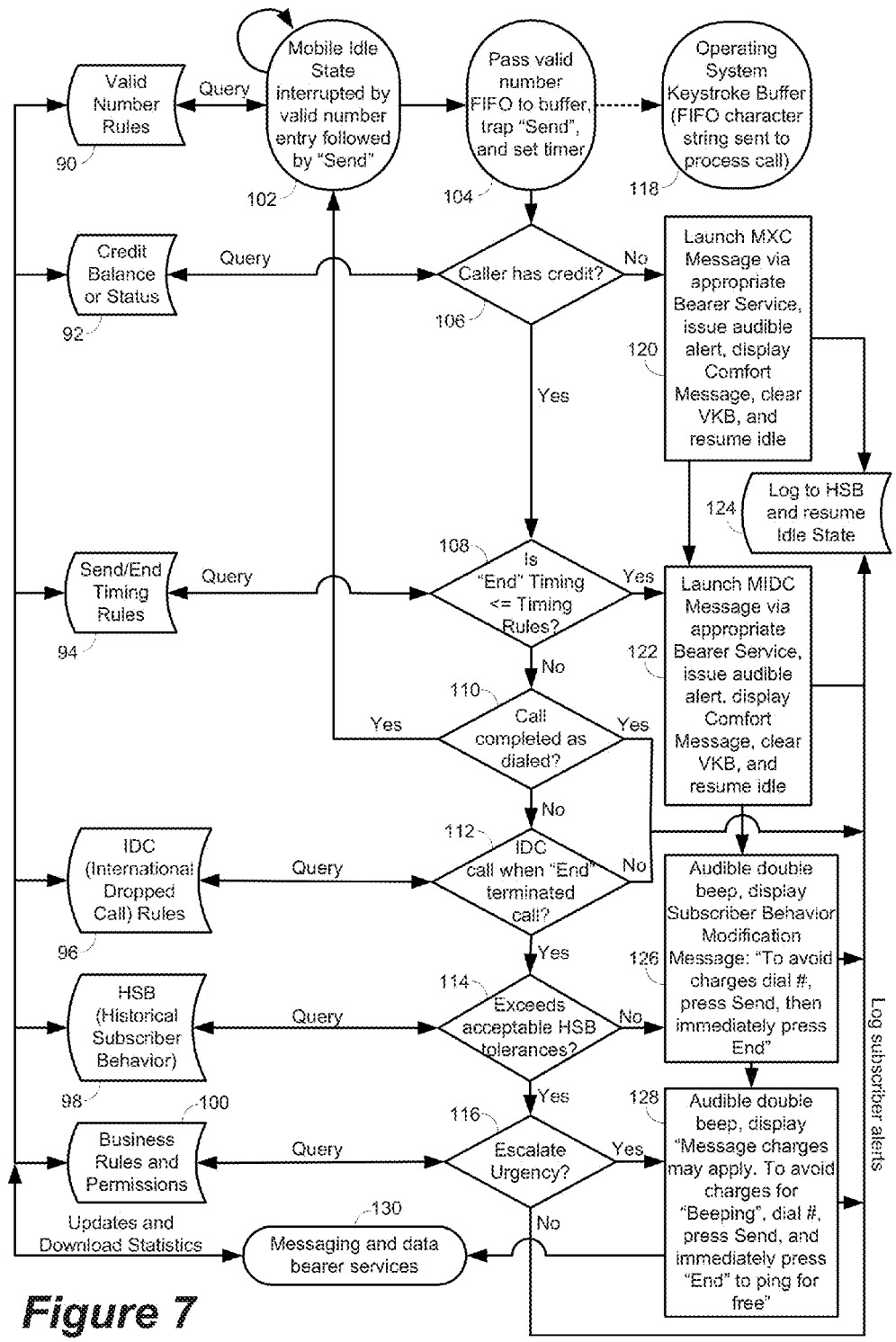
FIG. 7 illustrates the client logic of one embodiment of the invention.

FIG. 7 shows an example of the basic logic used by one or more methods of the invention to determine appropriate responses before, during and after IDC and ZC events, or where MIDC and or MZC behavior is used. For example, there may be rules related to valid numbers 90, credit balance or status 92, send/end timing 94, IDC 96 historical subscriber behavior (HSB) 98 and business rules and permissions 100. The flow may start at block 102 where a valid number and send is entered. At step 104, the number is sent to the virtual keypad buffer and a timer set and then to the operating system at block 118. At block 106, caller credit is checked with a query to the credit rules 92. If the caller does not have credit, then a modified zero credit message is initiated at step 120 and then logged in the HSB at step 124. If the caller has credit, the end timing is checked at block 108 with reference to the send end timing rules 94. If within the timing rules, the MIDC message is launched to initiate a call back and the mobile goes idle at step 122 and logged to the HSB at 124. If outside the timing rules, then the decision is made whether to complete the call as dialed at step 110. If yes, then the call is completed and then returned to the idle state 102 and logged in the HSB at 124. If no, then the decision is made at block 112 if an IDC call with reference to IDC rules 96. If not, it is logged in the HSB at 124. If yes, then the test as to whether the IDC exceeds HSB tolerances is performed at step 114 with reference to HSB 98. If the dialing pattern does not exceed those tolerances, an alert message is sent to A at block 126 and logged in HSB 124, and messaging ad data bearer services are engaged at step 130. If it exceeds acceptable HSB tolerances, the decision to escalate urgency is made at block 116 with reference to business and regulatory rules 100. If yes, an urgent alert message is sent to A at step 128 and recorded in HSB at 124 and messaging and data bearer services are engaged at step 130. If not, the calling pattern is simply logged in HSB at 124.

Figure 8:
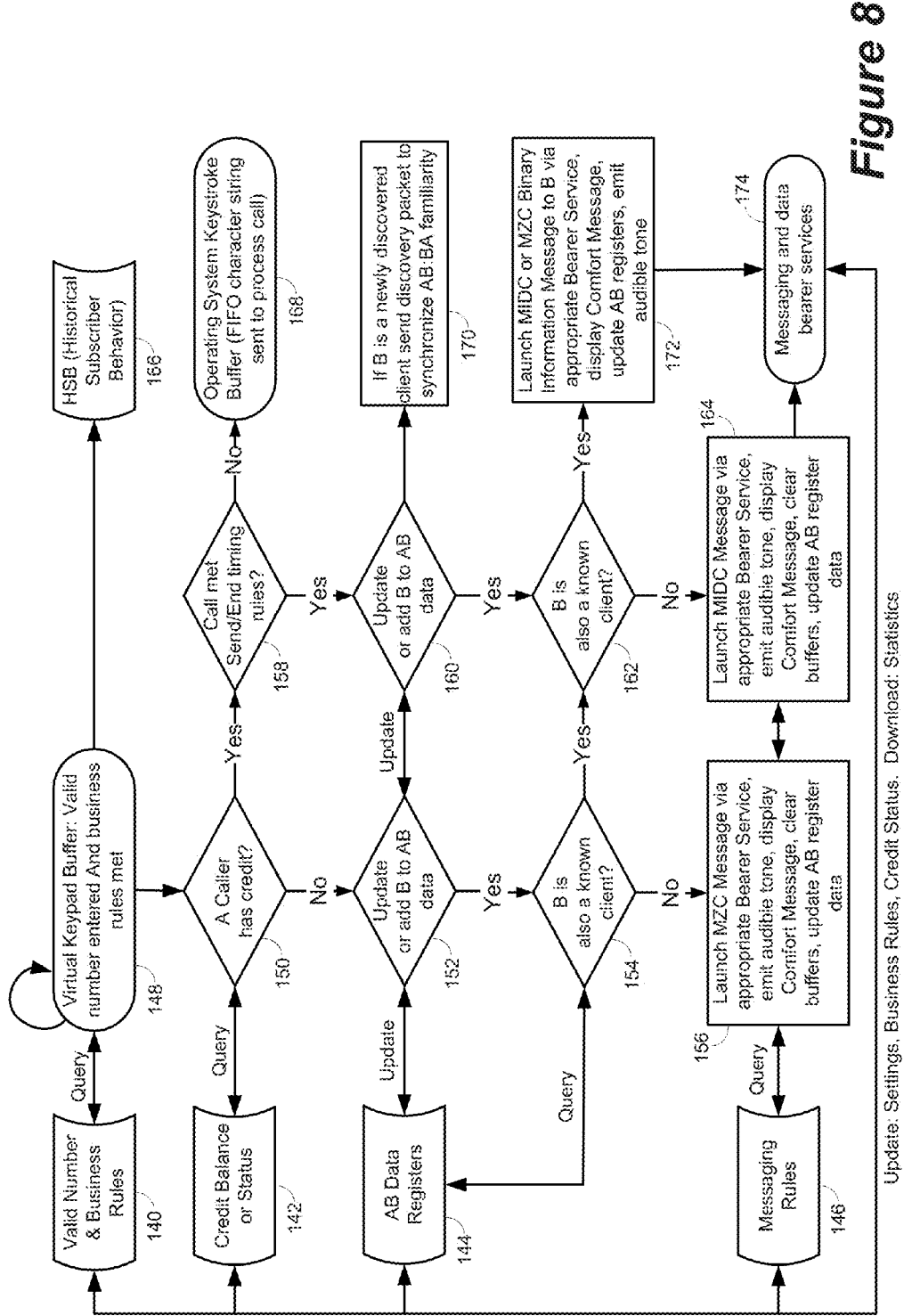
FIG. 8 illustrates the logic flow of a calling party of a call from A to B.

One example of how the logic flow involving the AB relationship database may be managed is shown in FIG. 8. Valid number and business rules 140 are provided, as well as credit balance or status 142, AB data registers 144 and messaging rules 146. At step 148, the virtual keypad buffer is filled pursuant to valid number and business rules 140 and the behavior is logged at HSB 166. At step 150, it is determined whether the caller has credit. If the caller has credit, the decision is made whether the call met the send/end timing rules. If not, then the dialing stream is sent to the network for processing at step 168. If the caller has no credit at step 150, the flow continues at step 152 to determine whether to update the AB rules to add B to AB data. If yes, the determination of whether B is a known client is made at step 154 through a query to AB Data Register 144. If not, a MZC process is launched at step 156 with reference to the messaging rules 146. If the call meets the send/end timing rules at step 158, then the decision to add B to AB data is made at step 160. If yes, it is determined whether B is a known client at step 162. IF yes, then a MIDC or MZC process is launched at step 172 and messaging and data bearer services are engaged at step 174 and the relationship is updated at AB data registers 144. Step 172 sends discovery packet to B to synchronize AB:BA. B is newly discovered at step 170 and the AB data is synchronized.

Client Discovery

Outgoing messaging is likely to have unique characteristics which would identify such messages as having been sent from a client operating from a mobile device. As new instances of the client are deployed on the mobile devices of other subscribers, it becomes increasingly likely that an A client message will be received by a B client mobile device. When a message is received by client B that is known to have come from a mobile with a client, this could be called client discovery, where the A client is unaware that B is a client but B is aware of A. As part of the AB relationship data captured on the client, B would then update its AB data to reflect that the A mobile has a client operating on it, and then send a short message to A which uniquely identifies to A that the B mobile also has a client operating. In this manner, both A and B now know that their respective AB communication relationships are also client AB client relationships.

Client to Client Messaging

Once two clients have discovered each other, standard text messaging between clients (peer to peer) could be consuming more overhead than an efficiently formatted machine readable message between clients, such as a binary message. A simple example of how this can be accomplished is to reserve two bytes in the binary payload for message type, which would allow one of over 64,000 unique messages to be selected for use by the receiving client, as opposed to sending variable length text messages. This method becomes more important when a network wants to display richer messages using formats such as .png, flash, .jpg, bitmap, gif or gif animations, or other such types of image formats that would consume considerably more bandwidth per message transaction. Such images or media could be shipped with the mobiles, or uploaded via broadcast or uploaded individually on a one time basis, and then reused by the client.

Post Discovery Client AB Interaction

Figure 9:
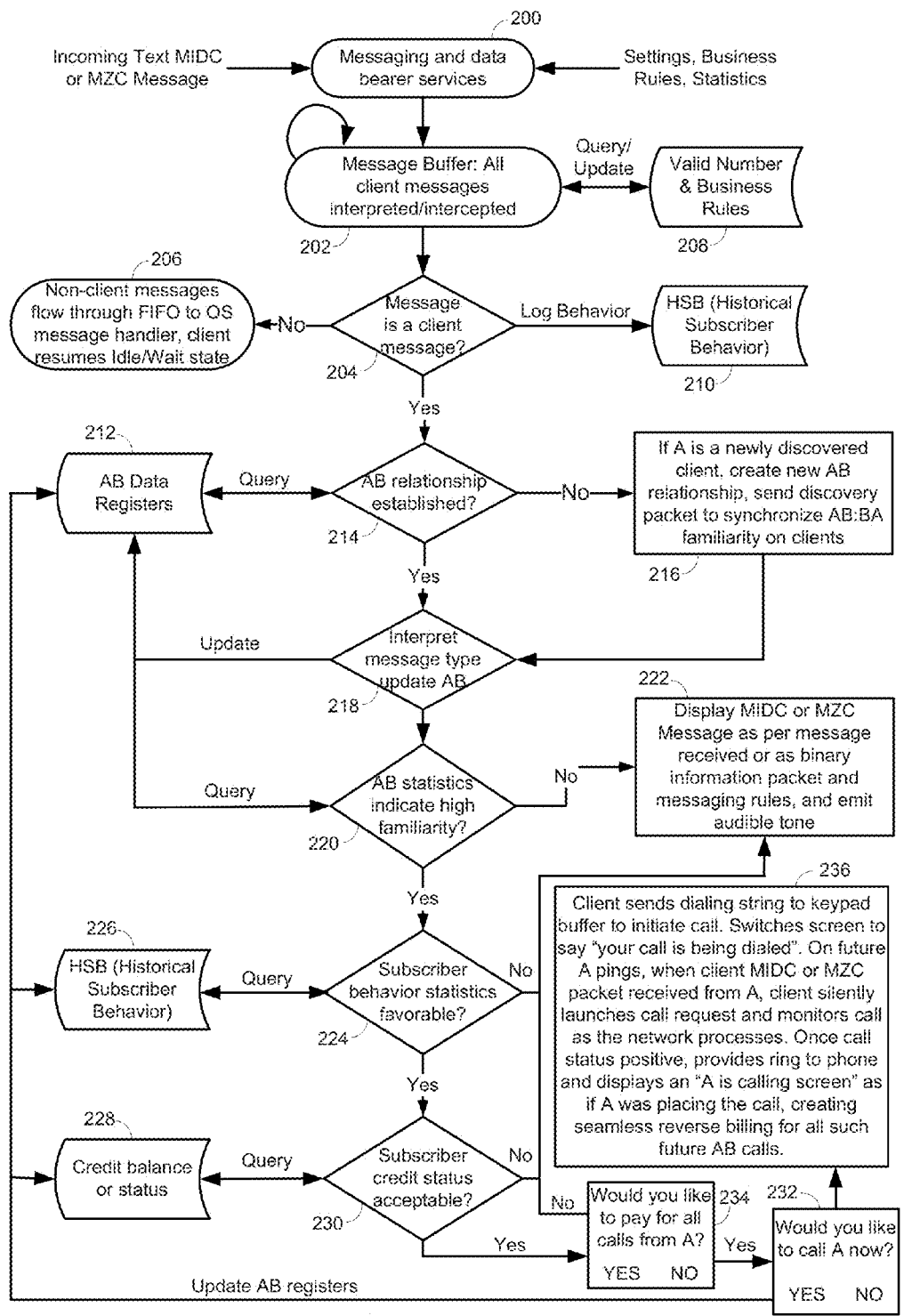
FIG. 9 illustrates the logic flow of a recipient of a call from A to B.

FIG. 9 shows an example of how a recipient client could manage initial discovery, and subsequent MIDC and or MZC events. FIG. 9 starts with a Messaging and Data Bearer Services at step 200, based on the Valid number and business rules 208, with the message buffer intercepted at block 202 and the behavior is logged at HSB 210. At step 204, a determination is made as to whether the message is a client message. If not, the non-client message flow is invoked at step 206. If the message is a client message, then the determination is made as to whether there is an AB relationship established at step 214, based on a query to the AB Data Registers 212. If not, then A is newly discovered client and discovery packets are sent at step 216. The flow continues for both baths at step 218, where the message type is interpreted to update AB Data Registers 212. At step 220, the AB statistics are examined to indicate high familiarity. If so, then the subscriber behavior statistics are examined based on a query to HSB 226. If there are favorable statistics, the subscriber credit status is examined at step 230 based on a query to Credit Balance or Status 228. Finally, B is presented an option to pay for a call from A at block 234. If the answer is no at either block 220, 224, 230, or 234, then the MIDC or MZC messages is displayed and processed at step 222. If B elects to pay for the call from A at 234, the option to call now is presented at step 232 and if yes, the call is processed as outlined in box 236 and the AB Data Registers 212 are updated.

In the example shown, the AB relationship could be familiar in any number of ways, such as a teenager who always gets her parents to pay for calls between them. As one example, once the behavior of B to MIDC or MZC events has been clearly established, such as B always replying, or replying a high percentage of the time, the B client may offer to make those events more convenient for B by offering to have the MIDC or MZC event automatically converted into a call which originates from their phone using their credit. Network business rules or guidelines may preclude that this convenience is offered by a client to a recipient of an MIDC, but possibly only for MZC recipients.

Alternative Dialing Methods

Mobile networks, when first implemented, necessarily tapped into the same behavioral patterns and used the same dialing protocols and techniques that users of fixed line telephony networks have applied for decades. The standard dialing pattern, or otherwise accepted method, to make a call on a mobile or telephony network is to enter the dialed party's phone number (example: 2345678901) and then "Send". The act of dialing a number on a mobile such as 2345678901, in of itself does not result in local interpretation by the MOS, or for that matter any other series or sequence of numbers and characters entered by a user to an MOS, except "Send", just as the original telephony strategies. The main difference between the two is that mobile benefited from being able to have the input "pre-entered" prior to pressing "Send", which causes the MOS to send the user input to the network for further interpretation and processing, as opposed to a network switch capturing the individual numbers as each is dialed. Mobile telephony network design requires that the MOS pass this sequence to a mobile network switch or element which uses embedded number rules and guidelines to match the dialed input against known number patterns and sequences to determine how to process the incoming call request packet. Many unique dialing patterns and sequences are reserved by telephony networks and their representative organizations, which when input by a user and passed to the network by a MOS may be properly interpreted by network switches. Examples of this include, but are not limited to, the area or country code portion of a dialed number sequence, such as "234", which allow telephony network switches to route call requests to the serving switch of the dialed party, and the balance of the dialed number sequence, such as "5678901" uniquely identifying the number of the dialed party to the local switch. In this manner, portions of the number sequence may be reused in as many areas or countries as there are unique area or country codes. In an attempt to differentiate a dialed call number sequence from one which could be interpreted as something other than a phone call, USSD based network services such as *98, or * services such as a *123#2345678901# (a "callme" service that generates a request for callback to the dialing party from 2345678901) use specific character and number sequences to clearly differentiate these from a regularly dialed call. These types of services rely on the MOS to capture each character and number entered and only remit the dialed number and character string when "Send" is received by the MOS. In this manner, unique character and number sequences can be assembled "precall", which can then be routed to a network service such as USSD to be processed as a network service as opposed to being processed as a voice call. The sequence of characters and numbers allows the network service to interpret this payload as a form of machine readable code.

For example [*123#2345678901#] is a callme USSD Service Request, interpreted to send a callme to 2345678901. The *123 part of the sequence allows the Mobile Service Center (MSC) to send the packet to the appropriate network element, and the network element knows that *123 is a service command to generate a callme request to 2345678901, as opposed to if the MSC sent a *98, which may tell the network element to connect the caller to his voice mail. In all such examples, the MOS, without any local interpretation, simply presents the sequence to the network when a "Send" is received, that is then processed by some type of network based service. Character and number sequences which match character and number sequences expected by a network element and or service may be logically processed in this manner, while all character and number sequences which do not match a valid pattern result in that network session being terminated.

Theoretically, such machine readable code entered by a user in the appropriate character and number sequence may invoke any number of services via interpretation by a network service or element. However, there are practical limitations to this strategy, mostly due to the practical limit of users to be "machine readable code" literate and the inconvenience to the user of having to generate such non-intuitive input.

As opposed to such non-intuitive and inconvenient methods of invoking such services as previously described, which require a user to input machine readable character and number sequences to invoke alternative network services, such as a USSD service, one or more methods may engage any number and type of network services in a more intuitive and convenient manner by introducing the user to dialing sequences which offer more convenience for the user, which may be interpreted uniquely by one or more methods of the invention while still resident in the VKB. Since the only dialing patterns which one or more methods of the client consider as "valid" for remission and subsequent processing by the MOS are those which have already been reserved for use by one or more network services, such as those mentioned as examples, any number of other dialing patterns and or dialing behaviors may be invoked by one or more methods of the invention, and this input may then be used by one or more methods to uniquely identify the intention and or desire of the user to initiate one or more services. Examples of such dialing patterns, but not limited to such examples are;

2345678901*,
  where the * replaces the 2345678901,Send,End sequence as a way to convert ZC and IDC events to MZC and MIDC events;
2345678901#, to invoke any number of other unique services
2345678901, or *2345678901, or other such reorganization of the dialing sequence to be uniquely identifiable.

Figure 10:
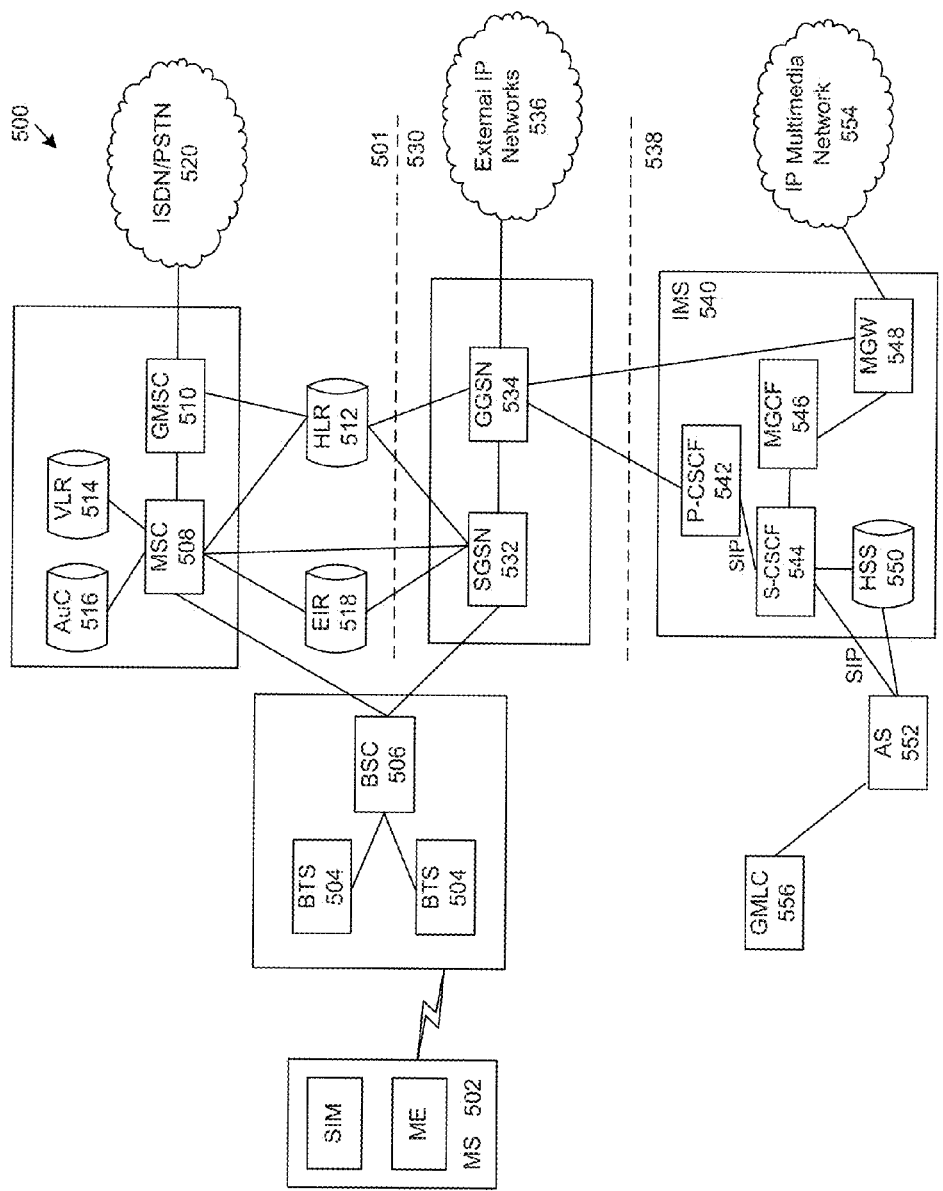
FIG. 10 illustrates a non-limiting example of a cellular mobile network (GSM) in which the present invention may be deployed.

One non-limiting example of how such dialing patterns may be used to improve user convenience for initiating a service, may include dialing pattern such as any cited above or other similarly reduced dialing requirement that is logically linked via one or more methods to trigger the assembly of a USSD packet which may render any number of services efficiently over USSD, such as a "call me" service where a user (A) currently enters *123#2345678901# (to send a callme to B). Such example of more complicated "machine readable code" sequence being replaced by one or more methods of the invention may be wherein a user enters 2345678901*, which is interpreted by one or more methods of the invention as a "callme" request, or other such request for a return call. The invention would translate the input sequence and then send *123#2345678901# to the MOS, to be processed by one or more network elements. There are numerous other such examples where simplification of user input requirements may be logically connected to network services, through the utilization of one or more methods of the invention, limited solely by the theoretical limitations of a users input device, such as but not limited to a keypad, touchscreen, voice recognition, or other such methods any of which could provide such input.

Exemplary GSM/GPRS/IP Multimedia Network Architecture FIG. 10 shows a GSM/GPRS/IP multimedia network architecture 500 in which aspects of the present invention may be implemented. Other technologies, including CDMA, TDMA, 3GPP, 4.sup.th generation architecture, and other mobile system architectures are also contemplated within the scope of the present invention. Architecture 500 includes a GSM core network 501, a GPRS network 530 and an IP multimedia network 538. The GSM core network 501 includes a Mobile Station (MS) 502, at least one Base Transceiver Station (BTS) 504 and a Base Station Controller (BSC) 506. The MS 502 is physical equipment or Mobile Equipment (ME), such as a mobile phone or a laptop computer that is used by mobile subscribers, with a Subscriber Identity Module (SIM). The SIM includes an International Mobile Subscriber Identity (IMSI), which is a unique identifier of a subscriber. The BTS 504 is physical equipment, such as a radio tower, that enables a radio interface to communicate with the MS. Each BTS may serve more than one MS. The BSC 506 manages radio resources, including the BTS. The BSC may be connected to several BTSs. The BSC and BTS components, in combination, are generally referred to as a base station (BSS) or radio access network (RAN) 503.

The GSM core network 501 also includes a Mobile Switching Center (MSC) 508, a Gateway Mobile Switching Center (GMSC) 510, a Home Location Register (HLR) 512, Visitor Location Register (VLR) 514, an Authentication Center (AuC) 518, and an Equipment Identity Register (EIR) 516. The MSC 508 performs a switching function for the network. The MSC also performs other functions, such as registration, authentication, location updating, handovers, and call routing. The GMSC 510 provides a gateway between the GSM network and other networks, such as an Integrated Services Digital Network (ISDN) or Public Switched Telephone Networks (PSTNs) 520. In other words, the GMSC 510 provides interworking functionality with external networks.

The HLR 512 is a database that contains administrative information regarding each subscriber registered in a corresponding GSM network. The HLR 512 also contains the current location of each MS. The VLR 514 is a database that contains selected administrative information from the HLR 512. The VLR contains information necessary for call control and provision of subscribed services for each MS currently located in a geographical area controlled by the VLR. The HLR 512 and the VLR 514, together with the MSC 508, provide the call routing and roaming capabilities of GSM. The AuC 516 provides the parameters needed for authentication and encryption functions. Such parameters allow verification of a subscriber's identity. The EIR 518 stores security-sensitive information about the mobile equipment.

To gain access to GSM services, such as speech, data, and short message service (SMS), the MS first registers with the network to indicate its current location by performing a location update and IMSI attach procedure. The MS 502 sends a location update including its current location information to the MSC/VLR, via the BTS 504 and the BSC 506. The location information is then sent to the MS's HLR. The HLR is updated with the location information received from the MSC/VLR. The location update also is performed when the MS moves to a new location area. Typically, the location update is periodically performed to update the database as location updating events occur.

The GPRS network 530 is logically implemented on the GSM core network architecture by introducing two packet-switching network nodes, a serving GPRS support node (SGSN) 532 and a Gateway GPRS support node (GGSN) 534. The SGSN 532 is at the same hierarchical level as the MSC 508 in the GSM network. The SGSN controls the connection between the GPRS network and the MS 502. The SGSN also keeps track of individual MS's locations and security functions and access controls. The GGSN 534 provides a gateway between the GPRS network and a public packet network (PDN) or other IP networks 536. That is, the GGSN provides interworking functionality with external networks, and sets up a logical link to the MS through the SGSN. When packet-switched data leaves the GPRS network, it is transferred to an external TCP-IP network 536, such as an X.25 network or the Internet. In order to access GPRS services, the MS first attaches itself to the GPRS network by performing an attach procedure. The MS then activates a packet data protocol (PDP) context, thus activating a packet communication session between the MS. the SGSN, arc the GGSN.

In a GSM/GPRS network, GPRS services and GSM services can be used in parallel. The MS can operate in one three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time.

A class B MS can attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

A GPRS network 530 can be designed to operate in three network operation modes (NOM1, NOM2 and NOM3). Network operation modes of a GPRS network is indicated by a parameter in system information messages transmitted within a cell. The system information messages dictates a MS where to listen for paging messages and how signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS may not receive pages from a circuit switched domain when engaged in a data call, since the MS is receiving data and is not listening to a paging channel. In a NOM3 network, a MS can monitor pages for a circuit switched network while received data and vise versa.

The IP multimedia network 538 was introduced with 3GPP Release 5, and includes an IP multimedia subsystem (IMS) 540 to provide rich multimedia services to end users. A representative set of the network entities within the IMS 540 are a call/session control function (CSCF), a media gateway control function (MGCF) 546, a media gateway (MGW) 548, and a master subscriber database, called a home subscriber server (HSS) 550. The HSS 550 may be common to the GSM network 501, the GPRS network 530 as well as the IP multimedia network 538.

The IP multimedia system 540 is built around the call/session control function, of which there are three types: an interrogating CSCF (I-CSCF) 543, a proxy CSCF (P-CSCF) 542, and a serving CSCF (S-CSCF) 544. The P-CSCF 542 is the MS's first point of contact with the IMS 540. The P-CSCF 542 forwards session initiation protocol (SIP) messages received from the MS to an SIP server in a home network (and vice versa) of the MS. The P-CSCF 542 may also modify an outgoing request according to a set of rules defined by the network operator (for example, address analysis and potential modification).

The I-CSCF 543, forms an entrance to a home network and hides the inner topology of the home network from other networks and provides flexibility for selecting an S-CSCF. The I-CSCF 543 may contact a subscriber location function (SLF) 545 to determine which HSS 550 to use for the particular subscriber, if multiple HSS's 550 are present. The S-CSCF 544 performs the session control services for the MS 502. This includes routing originating sessions to external networks and routing terminating sessions to visited networks. The S-CSCF 544 also decides whether an application server (AS) 552 is required to receive information on an incoming SIP session request to ensure appropriate service handling. This decision is based on information received from the HSS 550 (or other sources, such as an application server 552). The AS 552 also communicates to a location server 556 (e.g., a Gateway Mobile Location Center (GMLC)) that provides a position (e.g., latitude/longitude coordinates) of the MS 502.

The HSS 550 contains a subscriber profile and keeps track of which core network node is currently handling the subscriber. It also supports subscriber authentication and authorization functions (AAA). In networks with more than one HSS 550, a subscriber location function provides information on the HSS 550 that contains the profile of a given subscriber.

The MGCF 546 provides interworking functionality between SIP session control signaling from the IMS 540 and ISUP/BICC call control signaling from the external GSTN networks (not shown). It also controls the media gateway (MGW) 548 that provides user-plane interworking functionality (e.g., converting between AMR- and PCM-coded voice). The MGW 548 also communicates with other IP multimedia networks 554.

Thus, there has been described systems and methods for modifying calling party behavior. Those skilled in the art will appreciate that numerous changes and modifications can be made to the preferred embodiments of the invention, and that such changes and modifications can be made without departing from the spirit of the invention. For example, the method may be implemented in a computer program that is resident in the mobile handset, or it may be implemented in a computer program that is resident on the SIM, a memory stick or memory card, or any combination thereof. One advantage of the SIM implementation is that the modified dialing behavior is transportable to other mobile devices simply by moving the SIM to that other mobile device. It is intended, therefore, that the appended claims cover all such equivalent variations as fall within the true spirit and scope of the invention.

What is claimed is:

1. A subscriber identity module (SIM) comprising computer-executable instructions that, when executed on a mobile device, effectuate operations comprising:
   capturing a dialing stream in a virtual input buffer;
   comparing the dialing stream to a history of dialing streams stored in a database;
   analyzing the history of dialing streams to determine that a desired dialing behavior of a calling party is to intentionally drop a call placed to a telephone number within the dialing stream; and
   in response to determining that the desired dialing behavior of the calling party is to intentionally drop the call placed to the telephone number within the dialing stream, transmitting a request for transmission of a message to a recipient mobile device associated with the telephone number within the dialing stream.

2. The SIM of claim 1, wherein the operations further comprise presenting an indication that the request for transmission of the message has been sent.

3. The SIM of claim 1, wherein the operations further comprise recording the dialing stream of the calling party in the database, and revising the dialing behavior based on the dialing stream.

4. The SIM of claim 3, wherein the database is located on one of the SIM, a memory stick, or a handset.

5. The SIM of claim 1, wherein the dialing stream is a dialing pattern that is a sequence of characters, numbers, or both that would not be recognized as a valid entry by a telephony network.

6. The SIM of claim 1, wherein the message comprises text requesting that a user place a call to a second telephone number.

7. The SIM of claim 1, wherein the request for transmission of the message is sent from a mobile subscriber with insufficient credit to make a call.

8. The SIM of claim 1, wherein statistically significant historical dialing behaviors and dialing patterns are used to improve the performance of the method.

9. The SIM of claim 1, wherein business rules validate dialing behavior and dialing patterns prior to transmitting the request for transmission of the message.

10. The SIM of claim 1, wherein the message is a text message.

11. The SIM of claim 1, wherein the request for transmission of the message is sent in the form of machine readable code in a network protocol that can be interpreted by one or more network elements.

12. The SIM of claim 11, wherein the machine readable code comprises a location.

13. The SIM of claim 11, wherein the machine readable code is constructed for delivery to a network element that provides a USSD service.

14. The SIM of claim 11, wherein the message is capable of being interpreted by client software resident on the recipient mobile device as the discovery of similar client software.

15. The SIM of claim 11, further comprising receiving a second message in the form of machine readable code in a second network protocol from the recipient mobile device, wherein the second message acknowledges discovery of the mobile device.

16. The SIM of claim 1, wherein the operations further comprise receiving a discovery message from the recipient mobile device, wherein the discovery message indicates that similar client software is operating on the recipient mobile device.

17. The SIM of claim 1, wherein the message is interpreted by the recipient mobile device as a command to automatically initiate a call back to the calling party.

18. The SIM of claim 1, wherein the message is in the form of machine readable code in a network protocol that can be interpreted by one or more network elements.

19. The SIM of claim 18, wherein the machine readable code in the network protocol is constructed for delivery to a network element that provides USSD service.

20. The SIM of claim 16, wherein the message is a text message and the discovery message is constructed for delivery to a network element that provides USSD service.

* * * * *